United States Patent
Régnier et al.

[11] Patent Number: 5,930,348
[45] Date of Patent: Jul. 27, 1999

[54] DYNAMICALLY CONTROLLED ROUTING OF CALLS IN INTELLIGENT NETWORKS

[75] Inventors: Jean Régnier, Laval; Jean Choquette, Boucherville; Yvon Archambault, Montréal, all of Canada

[73] Assignee: Northern Telecom Limited, Montreal, Canada

[21] Appl. No.: 08/822,618

[22] Filed: Mar. 20, 1997

[51] Int. Cl.⁶ .............................. H04M 7/00; H04B 3/38
[52] U.S. Cl. ..................... 379/221; 340/827; 370/232; 379/224; 379/230; 395/200.71
[58] Field of Search .................... 379/219, 220, 379/221, 224, 229, 230; 340/827; 370/232; 395/200.71

[56] References Cited

U.S. PATENT DOCUMENTS

| | | | |
|---|---|---|---|
| 4,284,852 | 8/1981 | Szybicki et al. | 379/221 |
| 4,979,118 | 12/1990 | Kheradpir | 379/221 X |
| 4,991,204 | 2/1991 | Yamamoto et al. | 379/221 X |
| 5,295,183 | 3/1994 | Langlois et al. | 379/221 X |
| 5,463,686 | 10/1995 | Lebourges | 379/221 X |
| 5,526,414 | 6/1996 | Bédard et al. | 379/221 |
| 5,548,639 | 8/1996 | Ogura et al. | 379/221 |
| 5,838,769 | 11/1998 | McNeil et al. | 379/221 X |
| 5,844,981 | 12/1998 | Pitchford et al. | 379/221 |

FOREIGN PATENT DOCUMENTS 44 41 356 A1  6/1995  Germany .................. H04Q 3/47

OTHER PUBLICATIONS

*Dynamically Controlled Routing* by Hugh Cameron and Serge Hurtubise, Telesis No. 1 (1986), pp. 33–37.

*State–Dependent Dynamic Traffic Management for Telephone Networks* by Jean Régnier and W. Hugh Cameron, IEEE Communications Magazine (Oct. 1990), pp. 42–53.

*A Dynamic Routing System Based on the Intelligent Network Architecture* by Gerhard Fischer, Josef Rammer, and Kurt Hofmann, XV International Switching Symposium (ISS '95) vol. 2 (Apr. 1995), pp.288–92.

*Primary Examiner*—Harry S. Hong
*Attorney, Agent, or Firm*—Thomas Adams

[57] ABSTRACT

An "Intelligent" telecommunications network comprises a plurality of switching units interconnected by links and connected to a central computer unit by a data communication system. For dynamic routing of a call, a first switching unit responds to a destination address in a call to attempt a direct link to a neighboring switching unit and, in the event that the attempt is unsuccessful, issues to the central computer unit a message containing the destination address. The central computer unit uses the destination address to identify the unsuccessful link; (ii) updates a routing database to identify the link as unavailable; (iii) determines an alternative route for the call using a tandem node and (iv) compiles a return message including a network address for a tandem switching unit and transmits it to the first switching unit. The latter attempts to route the call via a link to the tandem unit which attempts to complete the call by a direct link to the destination switching unit. The tandem node switching unit also queries the central computer if it cannot complete the call by a direct link to the destination switching unit, whereupon the central computer will set to zero the idleness of the direct link which the tandem unit attempted and then determine an alternate route from the tandem unit to the destination, i.e. with the idleness factors of both direct links set to zero, resulting in an alternate route having three links.

12 Claims, 6 Drawing Sheets

DYNAMICALLY CONTROLLED ROUTING OF CALLS IN INTELLIGENT NETWORKS

TECHNICAL FIELD

The invention relates to a method and apparatus for dynamic routing of calls in telecommunications networks, particularly so-called "intelligent networks".

BACKGROUND ART

For many years, telecommunications networks have used fixed hierarchical routing (FHR), which is still the most common form of call routing used by North American telephone companies. In 1981, however, Northern Telecom introduced Dynamically Controlled Routing (DCR) which makes use of the capabilities of modern stored program control switches with high-availability, real-time data processing abilities and the "intelligence" of a central computer, typically called the network processor (NP). Periodically, say every ten seconds, the switches report to the network processor the status of their trunk groups, using a data communications system comprising X-25 links. The network processor uses trunk group idleness information from the switches to update tables of alternate routing information kept by the switches. When a switch is unable to route a call because the selected direct link to the destination switch is blocked or unavailable, the switch attempts an alternative route obtained from its table of alternative routes.

For more information about dynamic routing, as compared with FHR, the reader is directed to articles entitled "Dynamically Controlled Routing" by Hugh Cameron and Serge Hurtubise, in Telesis, Vol 1, 1986, published by Bell-Northern Research and "State-Dependent Dynamic Traffic Management for Telephone Networks", by Jean Régnier and W. Hugh Cameron, IEEE Communications Magazine, October 1990, pp. 42–53. An early version of dynamically controlled routing is disclosed in U.S. Pat. No. 4,284,852 issued August 1981 and refinements are described in U.S. Pat. No. 5,526,414 issued December 1994. All four of these documents are incorporated herein by reference.

DCR has been followed by other networks which employ dynamic routing, including Dynamic Alternate Routing (DAR) by British Telecom and Real-Time Network Routing (RTNR) by AT&T Bell Laboratories, while it is reported that France Telecom have conducted trials of a STAR (System for Testing Adaptive Routing) and Bell Communications Research has conducted trials of DR5 (Dynamic Routing with 5 minute updates).

Dynamic routing yields significant advantages in network control. It ensures the efficiency of switching equipment by preventing excessive traffic from reaching the machine; inhibits the spread of switching congestion; maintains circuit group efficiency by reducing the number of links per call when facilities are congested; and makes full use of available idle facilities. Despite these advantages, dynamic routing systems are not widely used. One reason is that presently-available dynamic routing systems are not compatible with those of other manufacturers. Since most telephone companies use switching equipment from different manufacturers, dynamic routing cannot be deployed in their networks.

In recent years, so-called "intelligent networks"(IN) have been developed and are beginning to be implemented. Intelligent networks are intended to facilitate the development of a wide range of network-wide services. In an intelligent network, each switching element may interrupt call processing and exchange messages with a central computer to obtain instructions for completing the call. The messages are exchanged by way of a data communications system and must comply with existing and evolving standards and protocols, regardless of who made the switching equipment deployed in the network.

"Intelligent Networks"(IN) employ out-of-band signalling systems such as Signalling System No. 7 (SS7), also known as Common Channel Signalling No. 7 (CCS7). Such signalling systems exchange Transaction Capability Application Part (TCAP) messages or queries between network elements and the central computer to deploy selected services. In addition, the SS7 system carries ISDN-User Part (ISUP) messages between network node switching units to set up and route calls. Hence, the TCAP and ISUP messages are handled by a data communications system separate from the trunks which carry the calls themselves.

Similarities between Intelligent Networks and centralized Dynamic Routing networks, such as the use of a remote computer database and associated communication facilities, have led to a proposal to implement dynamic routing in such intelligent networks. Such proposal, entitled "A Dynamic Routing System Based on the Intelligent Network (IN) Architecture" by G. Fischer, J. Rammer and K. Hofmann was presented at ISS '95. Limitations of this proposal by Fischer et al, however, appear to be that it requires the switching units to be modified and cannot readily be implemented in networks which use switching elements from different manufacturers. Moreover, the proposal does not satisfactorily address limitations of DR systems resulting from anti-looping measures to prevent routing of a call back to a node that it had visited previously.

In order to ensure that looping does not occur, Nortel's DCR, and other dynamic routing schemes, limit the alternate route to a maximum of two links per call overflowing the direct link to the destination. At the tandem node, the dynamic routing scheme does not allow the call to obtain a second alternate route. If the second link of the alternate route is blocked or unavailable, the tandem node can only block the call or use exception routing to route it out of the DCR network. Such a limitation is undesirable since, with updates every ten seconds, there is a distinct possibility that the second link will be blocked. Reducing the update interval is not a satisfactory solution.

DISCLOSURE OF INVENTION

An object of the present invention is to avoid, or at least mitigate the limitations of known dynamic routing networks in providing a method and apparatus for implementing dynamic routing in intelligent networks, especially those which employ switching elements of different types and/or manufacture.

According to one aspect of the present invention there is provided a method of routing calls dynamically in a telecommunications network comprising a plurality of switching units and a central computer unit having access to a routing database, the switching units being interconnected by links comprising trunk groups and connected to the central computer unit by a data communication system, each switching unit having call processing software including triggers for initiating queries to the central computer unit during call processing, the method comprising the steps of:

at a first switching unit:
responding to a destination address in a call to attempt to route a call to a destination switching unit via a direct link and,
in the event that the attempt is unsuccessful or there is no direct link, issuing to the central computer unit a query message containing the destination address;

at the central computer unit:
  where the direct link exists but the attempt to use it was unsuccessful, responding to the query message by (i) identifying from the query message the link attempted unsuccessfully, (ii) updating the routing database to identify the link as unavailable for a predetermined period of time; whether the query resulted from a lack of a direct link or an unsuccessful attempt to route via an existing direct link, (iii) determining at least one alternative route for the instant call using a tandem switching unit, (iv) compiling a return message including a network address for the tandem switching unit and (v) transmitting the return message to the first switching unit;
at the first switching unit:
  routing the call via a direct link from the first switching unit to the tandem switching unit; and
at the tandem switching unit:
  attempting to complete the call by routing the call via a direct link from the tandem switching unit to the destination switching unit;
in the event that the tandem switching unit cannot complete the call via the third-direct link from the tandem switching unit to the destination switching unit,
at the tandem switching unit:
  sending to the central computer unit a second query message including said destination address,
at the central computer,
  responding to the second query message by (vi) identifying from the query message the direct link that the tandem switching unit attempted unsuccessfully, (vii) updating the routing database to identify such direct link as unavailable, while maintaining as unavailable the direct link first attempted by the first switching unit; (viii) determining at least one second alternative route for the instant call using a second tandem switching unit, (ix) compiling a return message including a network address for the tandem switching unit and (x) transmitting the return message to the first tandem switching unit;
at the first tandem switching unit:
  routing the call via a direct link from the first tandem switching unit to the second tandem switching unit; and
at the second tandem switching unit,
  attempting to route the call via a direct link from the second tandem switching unit to the destination switching unit.

According to a second aspect of the invention, there is provided a method of routing calls dynamically in a telecommunications network comprising a plurality of switching units and a central computer unit having access to a routing database, the switching units being interconnected by links comprising trunk groups and connected to the central computer unit by a data communication system, each switching unit having call processing software including triggers for initiating queries to the central computer unit during call processing, the method comprising the steps of:
at a first switching unit:
  responding to a destination address in a call to attempt to route a call to a destination switching unit via a direct link and,
  in the event that the attempt is unsuccessful or there is no direct link, issuing to the central computer unit a query message containing the destination address;
at the central computer unit:
  where there is a direct link but the attempt to use it was unsuccessful, responding to the query message by (i) identifying from the query message the link attempted unsuccessfully, (ii) updating the routing database to identify the link as unavailable;
  whether the query resulted from a lack of a direct link or an unsuccessful attempt to route via a direct link, (iii) determining at least one alternative route for the instant call using a tandem switching unit, (iv) compiling a return message including a network address for the tandem switching unit and (v) transmitting the return message to the first switching unit;
at the first switching unit:
  routing the call via a direct link from the first switching unit to the tandem switching unit; and at the tandem switching unit:
  attempting to complete the call by routing the call via a direct link from the tandem switching unit to the destination switching unit;
further at the central computer:
  monitoring continuously the number of queries generated by overflowing calls for each link and retaining these data;
  at intervals (TTCycle), each of which is at least equal to a mean call holding time h, determining for each link a measured rate $O_g(\Delta)/\Delta$ of such messages during a preceding time interval $\Delta$;
  comparing each said measured rate $O_g(\Delta)/\Delta$ with a predetermined threshold overflow call rate b; and
  adjusting a previously-set Target Overflow value $TT_g$ for each link in dependence upon the degree to which the measured rate exceeds or is less than said threshold overflow call rate b;
  and, upon receipt of a said query from said first switching unit, where the query resulted from an unsuccessful attempt to route a call via an existing direct link, determining the alternate route by the method steps of:
at the central computer unit:
  identifying the direct link that was an attempted unsuccessfully and setting to zero an idleness factor $I_g$ for such direct link,
  whether the query resulted from a lack of a direct link or an unsuccessful attempt to route via a direct link;
  calculating for each link of every potential alternate route for said call an idleness factor $I_g$ by subtracting from the current Target Overflow value $TT_g$ for the particular link the number of calls $AC_g$ alternate-routed via such link during the immediately-preceding mean call holding time interval h;
  calculating Residual Capacity RC for each possible alternate route as the minimum idleness of links that could be used in one of said possible alternate routes;
  selecting the alternate route with the greatest Residual Capacity as the preferred alternate route;
  determining an address for a tandem node in the preferred alternate route and sending a message incorporating said address to said first switching unit.

In the event that the Residual Capacity is less than or equal to zero, instead of the step of selecting an alternate route with the greatest Residual capacity, and the step of determining an address for the tandem node and incorporating the address in a message to the first switching unit, the method may comprise the step of returning a block recommendation, conveniently by means of a "Send-to-Resource" message from the central computer to the first switching unit.

According to a third aspect of the invention, there is provided telecommunications network apparatus comprising a plurality of switching units and a central computer unit having access to a routing database, the switching units being interconnected by links comprising trunk groups and connected to the central computer unit by a data communication system, each switching unit having call processing software including triggers for initiating queries to the central computer unit during call processing, first switching unit having means for responding to a destination address in a call to attempt to route a call to a destination switching unit via a direct link and, in the event that the attempt is unsuccessful or no direct link exists, issuing to the central computer unit a query message containing the destination address;

the central computer unit having means for responding to the query message where the direct link exists but the attempt to use it was unsuccessful, by (i) identifying from the query message the link attempted unsuccessfully, (ii) updating the routing database to identify the link as unavailable;

whether the query resulted from a lack of a direct link or an unsuccessful attempt to use a direct link, (iii) determining at least one alternative route for the instant call using a tandem switching unit, (iv) compiling a return message including a network address for the tandem switching unit and (v) transmitting the return message to the first switching unit;

the first switching unit further comprising means for responding to the return message by routing the call via a direct link from the first switching unit to the tandem switching unit;

the tandem switching unit comprising means for attempting to complete the call by routing the call via a direct link from the tandem switching unit to the destination switching unit; and in the event that the tandem switching unit cannot complete the call via such direct link, sending to the central computer unit a second query message including said destination address, the central computer further comprising means for responding to the second query message by (vi) identifying from the query message the direct link attempted unsuccessfully by the tandem switching link, (vii) updating the routing database to identify the link as unavailable, while maintaining as unavailable the direct link attempted unsuccessfully by the first switching unit; (viii) determining at least one second alternative route for the instant call using a second tandem switching unit, (ix) compiling a return message including a network address for the second tandem switching unit and (x) transmitting the return message to the first tandem switching unit;

the first tandem switching unit further comprising means for responding to the return message to route the call via a direct link from the first tandem switching unit to the second tandem switching unit;

the second tandem switching unit comprising means for attempting to route the call via said direct link from the second tandem switching unit to the destination switching unit.

According to a fourth aspect of the invention, there is provided telecommunications network apparatus comprising a plurality of switching units and a central computer unit having access to a routing database, the switching units being interconnected by links comprising trunk groups and connected to the central computer unit by a data communication system, each switching unit having call processing software including triggers for initiating queries to the central computer unit during call processing, a first switching unit comprising means for responding to a destination address in a call to attempt to route a call to a destination switching unit via a direct link and, in the event that the attempt is unsuccessful or there is no direct link, issuing to the central computer unit a query message containing the destination address;

the central computer unit comprising means for responding to the query message, where there is a direct link but the attempt to use it was unsuccessful, by (i) identifying from the query message the link attempted unsuccessfully, (ii) updating the routing database to identify the link as unavailable; and, whether the query resulted from a lack of a direct link or an unsuccessful attempt to route via a direct link, (iii) determining at least one alternative route for the instant call using a tandem switching unit, (iv) compiling a return message including a network address for the tandem switching unit and (v) transmitting the return message to the first switching unit; the first switching unit further comprising means responsive to the return for routing the call via a direct link from the first switching unit to the tandem switching unit;

the tandem switching unit further comprising means for attempting to complete the call by routing the call via said direct link from the first switching unit to the destination switching unit;

wherein the central computer further comprises means for:

monitoring continuously the number of query messages generated by overflowing calls for each link and retaining these data;

at intervals (TTCycle), each of which is at least equal to a mean holding time h, determining for each link a measured rate $O_g(\Delta)/\Delta$ of such messages during a preceding time interval $\Delta$;

comparing each said measured rate $O_g(\Delta)/\Delta$ with a predetermined threshold overflow call rate b; and adjusting a previously-set Target Overflow value $TT_g$ for each link in dependence upon the degree to which the measured rate exceeds or is less than said threshold overflow call rate b;

the central computer yet further comprising means responsive to receipt of a said query from said first switching unit, where the query resulted from an unsuccessful attempt to route a call via an existing direct link, for determining the alternate route by identifying the direct link that was attempted unsuccessfully and setting to zero an idleness factor $I_g$ for such direct link, whether the query resulted from a lack of a direct link or an unsuccessful attempt to route via an existing direct link, calculating for each link of every potential alternate route for said call an idleness factor $I_g$ by subtracting from the current Target Overflow value $TT_g$ for the particular link the number of calls $AC_g$ alternate-routed via such link during the immediately-preceding call holding time interval h;

calculating Residual Capacity RC for each possible alternate route as the minimum idleness of links that could be used in one of said possible alternate routes;

selecting the alternate route with the greatest Residual Capacity as the preferred alternate route;

determining an address for a tandem node in the preferred alternate route and sending a message incorporating said address to said first switching unit.

In the event that the Residual Capacity is less than or equal to zero, instead of selecting an alternate route with the greatest Residual capacity, and determining an address for the tandem node and incorporating the address in a message to the first switching unit, the central computer may return a block recommendation, conveniently by means of a "Send_to_Resource" message to the first switching unit.

In embodiments of the second and fourth aspects of the invention, the Residual Capacity RC may be determined for each possible two-link alternate route, i.e.

$$RC_{od} = \min_T [I_{ot}, I_{td}]$$

where $I_{OT}$ and $I_{TD}$ are the idleness of link OT and link TD, respectively.

Prior to the accumulation of any overflow messages, the Target Overflow value $TT_g$ may be set initially to a predetermined value.

The tandem node switching unit may also issue a query message to the central computer in the event that it cannot complete the call by a direct link to the destination switching unit, and the central computer may then determine, using the similar steps as those in response to the first query from the first switching unit, an alternate route from the first tandem node to the destination node, but with the both the idleness factor for the direct link attempted by the first switching unit and the idleness factor for the second direct link attempted by the tandem switching unit set to zero.

BRIEF DESCRIPTION OF THE DRAWINGS

An embodiment of the invention will now be described by way of example only with reference to the accompanying drawings, in which.

BEST MODES FOR CARRYING OUT THE INVENTION

For convenience, the terminology used in the following description for triggers, and so on, generally is that used in North America, perhaps as specified in Bellcore standards. It should be appreciated that in other countries similar items are identified by different names, perhaps as specified in International Telecommunications Union (ITU) standards.

Figure 1:
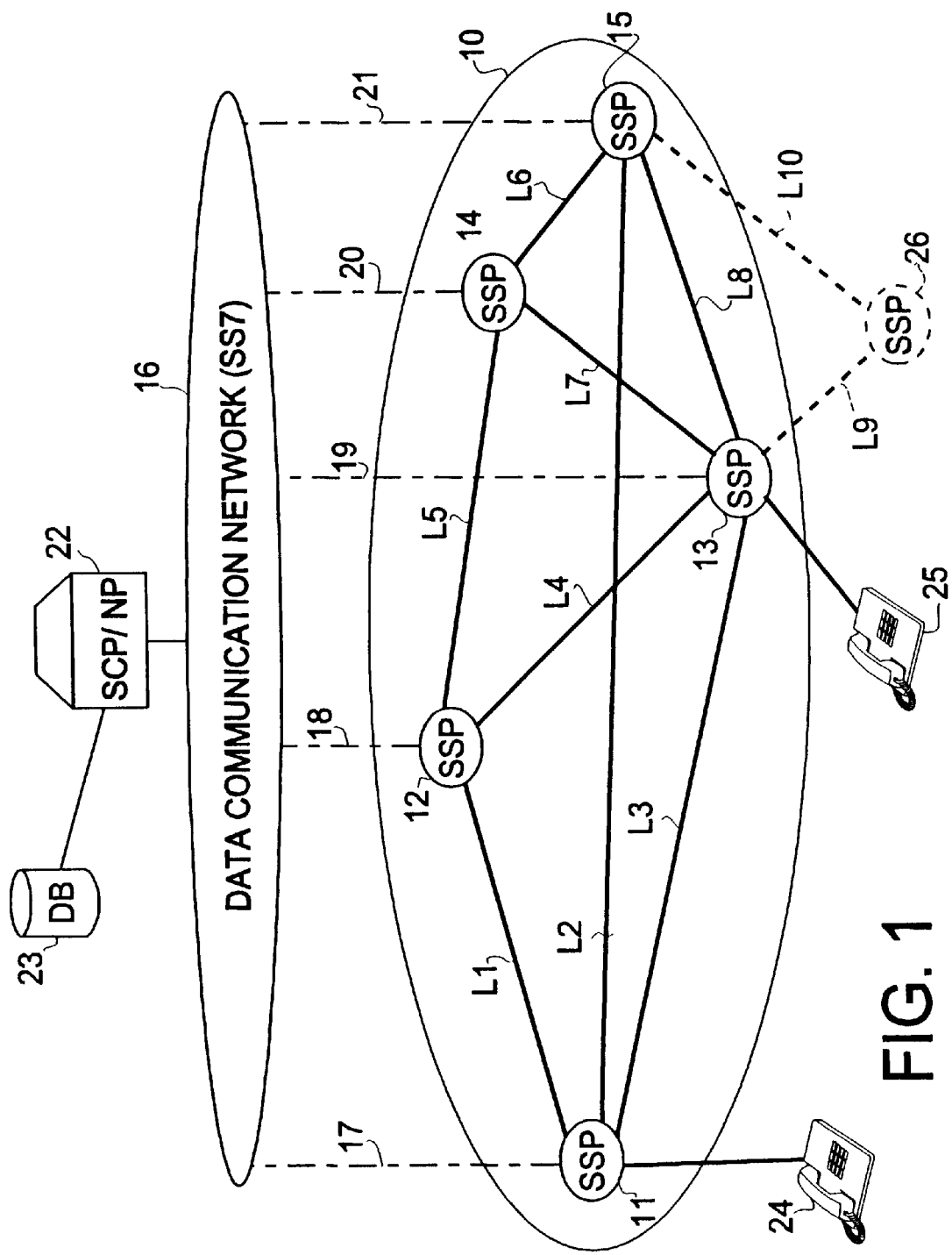
FIG. 1 is a block schematic representation, much simplified, of a portion of a so-called "intelligent network" employing dynamic routing according to the present invention (INMDR)

Referring to FIG. 1, the illustrated portion of an Intelligent Network 10 comprises five Service Switching Points (SSPs) 11, 12, 13, 14 and 15, respectively, are interconnected by links L1–L8, which comprise trunk groups between the respective switching units. The SSPs 11–15 are coupled to a Signalling System Number 7 (SS7) communications network 16 by messaging/signalling links 17–21, respectively, for communication with a central computer in the form of a Service Control Point/Network Processor (SCP/NP) 22 which has, or has access to, a routing database 23. Each SSP is a network node normally associated with a central office switching unit having SS7 messaging capability. For simplicity, only five Service Switching Points (SSPs) are shown. In a typical system, there would be many more SSPs and they would usually communicate with the SCP/NP 22 by way of Signal Transfer Points (STP) which are signalling hubs or concentrators which also are not shown for clarity. The Service Control Point/Network Processor (SCP/NP) 22 is an "intelligence centre", i.e. a central computer with access to application databases enabling it to deliver various combinations of features, such as 1-800 number service and call redirection. The SCP/NP 22 could be a separate computer connected to the Intelligent Network (e.g. a Network Processor), or it could be a standard telephone company SCP.

Each SSP has standard Intelligent Network call processing software including "Point-in-Call triggers" which can be provisioned or set to interrupt call processing momentarily and initiate a TCAP query to the SCP/NP 22 for instructions on how to complete the call processing.

The SCP/NP 22 is programmed to enable it to determine alternate routes based solely upon Network_Busy TCAP message received from switching units throughout the network. In contrast to a network processor in a DCR system, which updates the routing recommendations every 10 seconds based upon link idleness information sent to it by all of the switching units, and then downloads recommendations to the switching units; the SCP/NP 22 computes an individual routing recommendation every time it receives a Network Busy query from a switching unit. Also, the SCP/NP 22 does not download alternate routing recommendations every 10 seconds for storage at the switching units. Instead, it merely gives the individual switching unit the alternate route(s) as and when requested.

The switching units do not need special INMDR application software to report link idleness to the SCP/NP 22. Consequently, any switching unit capable of IN operation can be used, providing the required triggers are implemented and active.

Operation of the intelligent network of FIG. 1 will now be described with reference also to FIG. 2, which depicts message exchange during the setting up of an alternate route using one tandem node.

Figure 2:
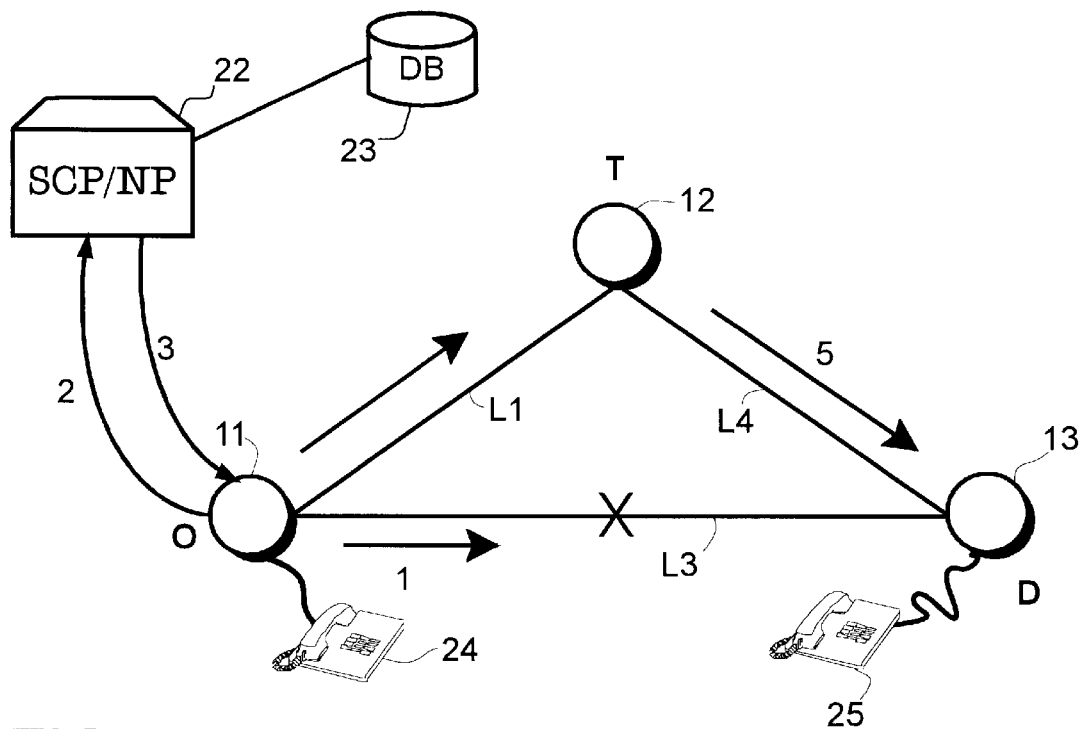
FIG. 2 illustrates alternate routing of a call in such network using one tandem node.

Referring to FIGS. 1 and 2, a Calling Party 24, identified by a telephone set associated with SSP 11, seeks to place a call to a Called Party 25, identified by a second telephone set associated with SSP 13.

(1) The switching unit of SSP 11 processes the dialled digits in the usual way, identifies SSP 13 as the destination node, and attempts to route the call via a circuit group in direct link L3.

Figure 4:
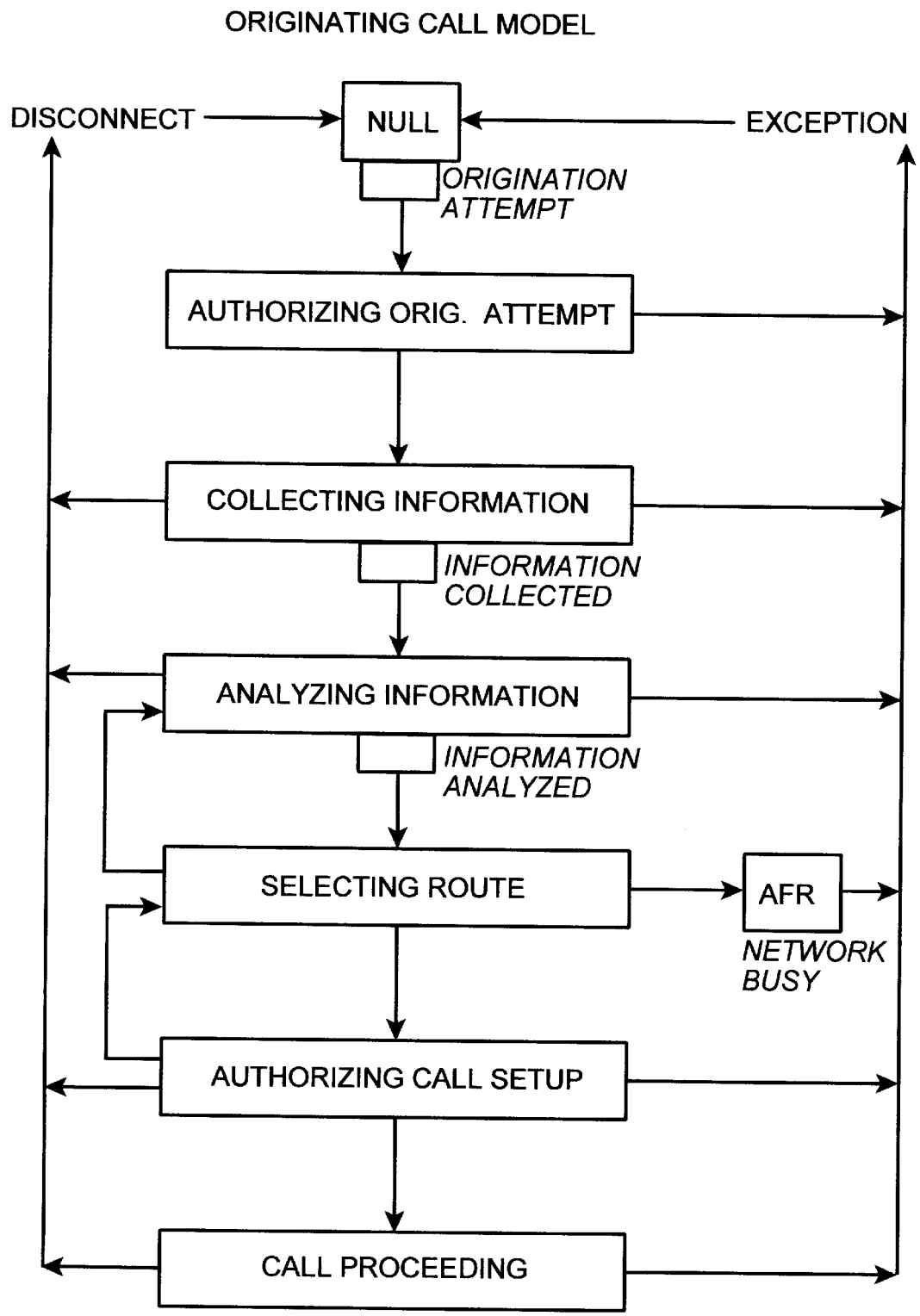
FIG. 4 illustrates an Originating Call Model for processing such a call.

(2) Link L3 has no circuit groups available. Consequently, when the originating switching unit at SSP 11 has exhausted its list of circuit groups, it encounters an Automatic Flexible Routing (AFR) trigger (providing the Calling Party has subscribed to this service). The AFR trigger occurs after the "Selecting Route" point in the call processing, as shown in the Originating Call Model shown in FIG. 4. The originating switching unit SSP 11 checks that there are no gapping controls in effect for the call and then sends a Network_Busy TCAP message to the SCP/NP 22. It should be noted that the switching unit might have several groups of AFR triggers for different purposes. The group associated with dynamic alternate routing would have a distinct address at the SCP/NP 22. Contents of Network_Busy and other messages are given in GR-1298-CORE AIN 0.2 Generic requirements, December 1994, or in GR-1284-CORE AIN 0.1, August '92. The contents of both of these documents are incorporated herein by reference.

(3) Upon receipt of the Network_Busy TCAP message, the SCP/NP 22 determines from it that the originating node is SSP 11 and the destination node is SSP 13 and infers therefrom that link L3 is not available. In its routing database 23, SCP/NP 22 sets the idleness index of link L3 to zero for a preset period of, say, 10 seconds. During that 10 second period, link L3 will be unavailable for recommendation in an alternate route. Using the newly-updated routing data, the SCP/NP 22 determines the preferred alternate route(s). As will be described in more detail later, for each possible alternate route of two links OT and TD between originating node O, tandem node T and destination node D, the SCP/NP 22 calculates the Residual Capacity as $$RC_{od} = \min_{T}[I_{ot}, I_{td}]$$

where $I_{OT}$ and $I_{TD}$ are the idleness of links OT and TD, respectively. The SCP/NP 22 then returns one of two TCAP messages to the SSP 11, namely (i) Analyze_Route or (ii) Send_To_Resource. Assuming that the SCP/NP 22 determines that links L1 and L4 and tandem node SSP 12 are available and preferred as an alternative route, it issues an Analyze_Route TCAP message to SSP 11. The Analyze_Route message contents are as set out in Section 5.2.2.1 of TR-NWT-001285, AIN 0.1 SCP interface, August 1992, and section 5.2.2.2 of GR-1299-CORE Issue 3, July 1996, INGR: Switch-SCP/Adjunct interface. Both of these documents are incorporated herein by reference. For the purposes of dynamic routing, the SCP/NP 22 includes in the Analyze_Route message the appropriate trunk group index to redirect the call to tandem SSP 12. The SCP/NP 22 may include in the Analyze_Route message up to three alternate routes namely (i) Primary Trunk Group, (ii) Alternate Trunk Group, and (iii) Second Alternate Trunk Group. In this case, the SCP/NP 22 might identify links L2 and L8 and tandem node SSP 15 as a second alternate route and so include the route index of a trunk group in link L2 as a Second Alternate Trunk Group.

(4) Upon receipt of the Analyze_Route message, SSP 11 resumes call processing at the Select_Route Point in Call and routes the call to SSP 12 using the recommended trunk in link L1.

(5) SSP 12 completes the call to destination node SSP 13 by way of link L4 in the normal way.

In the event that the SCP/NP 22, when queried by SSP 11, cannot recommend an alternative route with a suitably high probability of completion, it may return a Send_To_Resource message to the SSP 11, requesting it to play a terminating announcement. In essence, the SCP/NP 22 issues a "BLOCK" recommendation.

Figure 3:
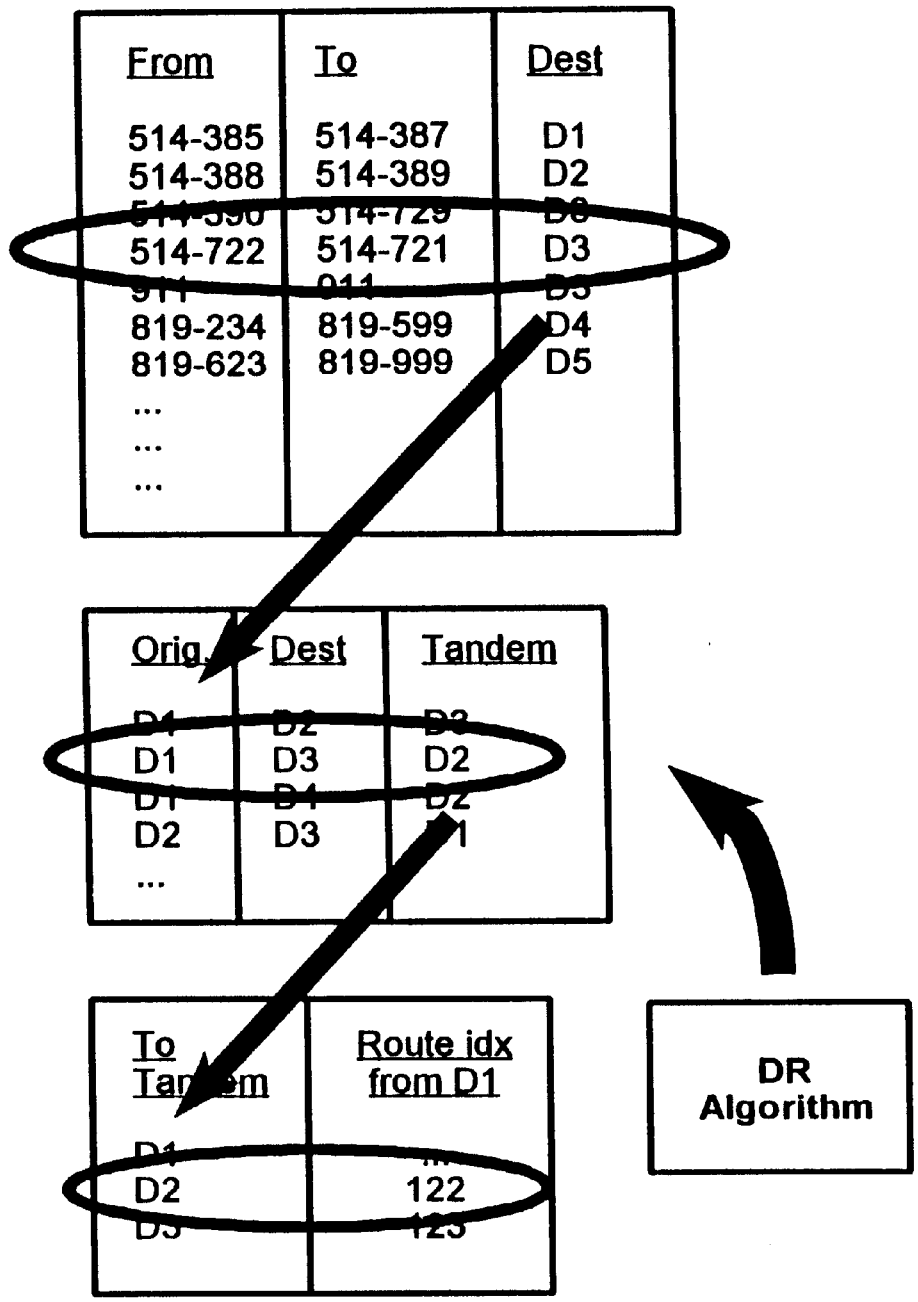
FIG. 3 illustrates datafill at a Service Control Point/Network Processor (SCP/NP) within the network.

FIG. 3 illustrates, as an example, datafill for the routing tables at the SCP/NP 22, enabling it to identify the destination switching unit when the querying switching unit supplies only the called destination number. The first table lists the destination nodes/switching units for different groups of NPA-NNX numbers. The second table lists preferred tandem nodes for each pair of an origin node and a destination node. The third table, i.e. the "Tandem to Route Index" table, maintains a list of route indices for all of the switching units in the network. (Unless the switch translations are such that the same index is valid in every switch.)

It is envisaged that, in order to simplify the datafill in the SCP, a Bellcore equivalent of the parameter "RouteList", in the Route_Select_Failure message of the ITU standard, could be used. This parameter contains the list of routes tried by the Service Switching Function (SSF) when trying to route the call before the trigger. This information could possibly be used to eliminate the first SCP table, used to determine the destination switch. This would also simplify the maintenance of the SCP datafill from a TelCo perspective as this table would not have to be maintained.

As previously mentioned, in order to avoid looping, known dynamic routing systems do not allow the tandem node to request an alternate route if it cannot complete the call by the direct second link. Embodiments of the present invention, however, may allow "multiple tandeming" by allowing a tandems node to request an alternate route, in which case the alternate route might comprise more than one tandem and three or even more links. It was demonstrated by modelling that, depending upon the configuration of the network, there might be an improvement in call completion rates if alternate routes of three or more links are permitted. It was also found that a novel algorithm at the SCP/NP 22, to be described later, ensured that, if there is already a high traffic loading in the network, three link alternate routes would be less likely to be given out by the SCP/NP 22.

Figure 5:
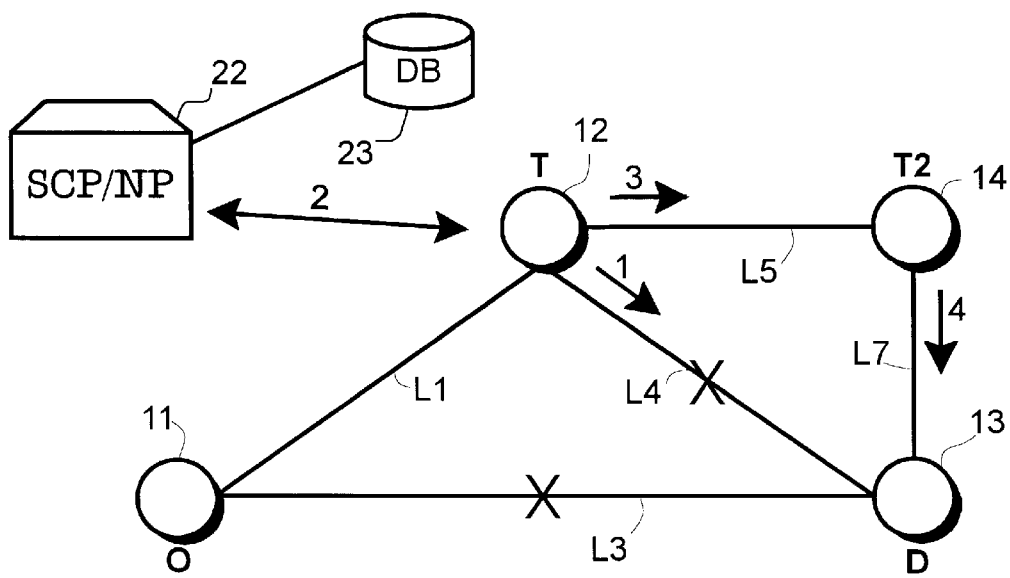
FIG. 5 illustrates alternate routing using two tandem nodes.

Such multiple-tandem alternate routing will now be described with reference also to FIG. 5, which illustrates a sequence of messages subsequent to those depicted in FIG. 2. It is assumed, therefore, that the switching unit at SSP 11 attempted to route the new call via a trunk group in link L3. Because there were no trunk groups available, the switching unit sent a Network_Busy TCAP message to SCP/NP 22 and received an Analyze_Route message recommending SSP 12 as the tandem node. The switching unit at SSP 11 routed the call to SSP 12 via a trunk group in link L1. This is similar to the sequence described with reference to FIG. 2. This time, however, by the time SSP 12 attempts to route the call via link L4 to SSP 13, link L4 also is unavailable. The switching unit at SSP 12 will attempt the circuit groups in turn, as usual. When it has exhausted its circuit group list, the SSP 12 switching unit will encounter an AFR trigger causing it to interrupt the call processing and send a Network_Busy TCAP message to SCP/NP 22. As before, SCP/NP 22 will use the information in the Network_Busy message to infer that link L4 also is unavailable and set its idleness index to zero for the same preset period of, say, 10 seconds. SCP/NP 22 will then compute the preferred alternate route from SSP 12 to SSP 13 and, in doing so, will treat both link L3 and link L4 as unavailable since it is still within 10 seconds from the point at which the SCP/NP 22 set the idleness index of link L3 to zero. Consequently, the SCP/NP 22 cannot use link L3 and node SSP 11 is the second alternate route. Assuming that the SCP/NP 22 determines links L5 and L7 and tandem node SSP 14 as the preferred alternate route, it will send to SSP 12 an Analyze_Route message including the trunk group index of a trunk group in link L5. Upon receipt of the Analyze_Route message, SSP 12 will route the call to second tandem SSP 14 which will complete the call to destination SSP 13 via a circuit group in link L7.

If, when second tandem SSP 14 attempted to complete the call to SSP 13 it could not because, by that time, link L7 also was not available, it could also query the SCP/NP 22 for a third alternate route. It is more likely that this time, however, the call would then be blocked or directed to an exception route.

Figure 6:
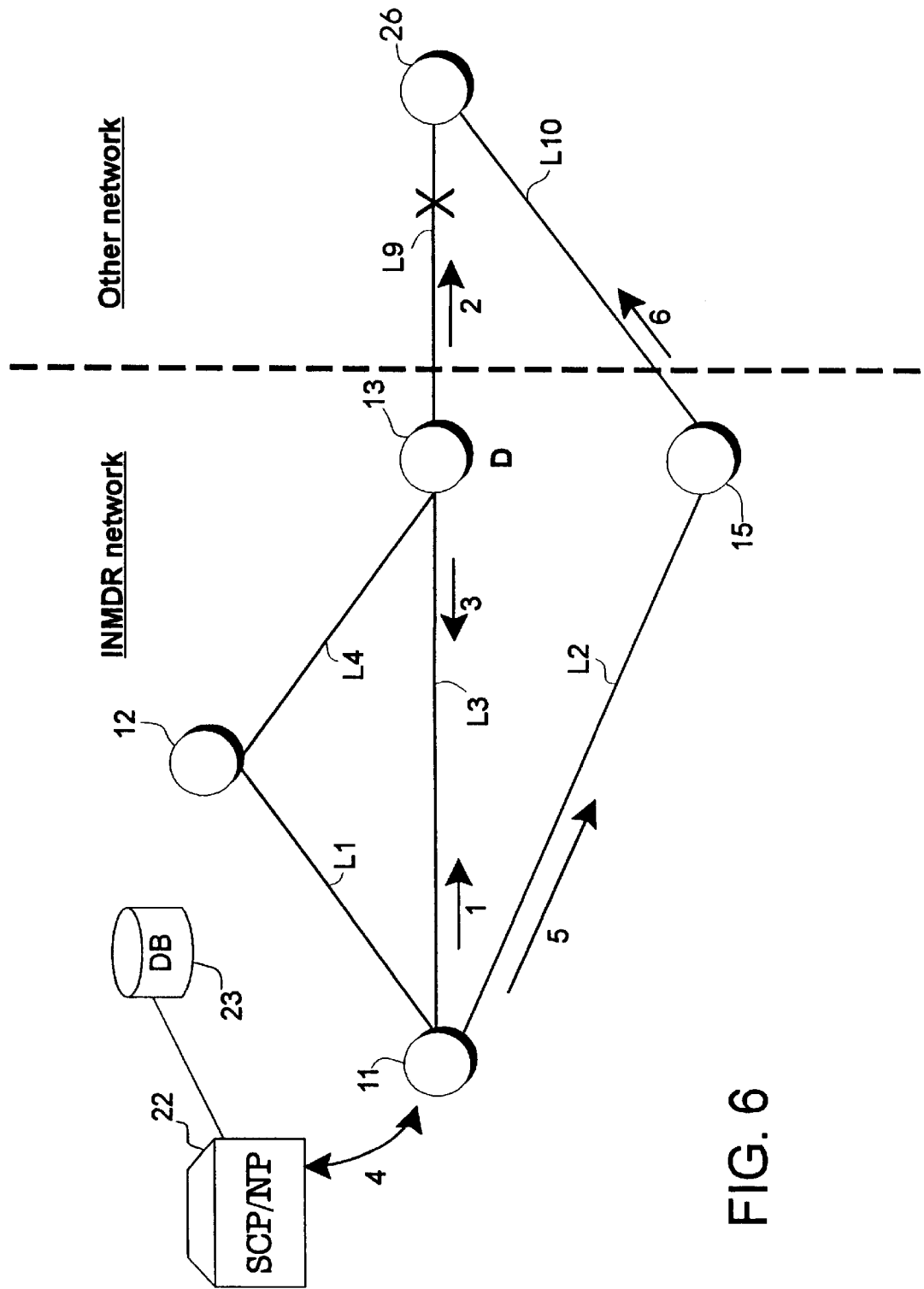
FIG. 6 illustrates alternate routing at a gateway to another network when a route advance feature at an originating switch is active.

Typically, the exception route might be identified in each Analyze_Route TCAP message from the SCP/NP 22, for example as the last of three possible alternate routes, and would cause the querying SSP to route the call outside the network, for example to another carrier, for completion using other facilities, if available.

Where facilities in an adjacent network are not available, and a call is blocked at a gateway node of the INMDR network, embodiments of the present invention may route the call to another gateway, if available, using Route Advance Interworking as illustrated in FIG. 6. As before, SSP nodes 11, 12, 13 and 15 are within the Intelligent Network with Multi-vendor Dynamic Routing. Another node 26 is in an adjacent network operated by, for example, a different operating company and identified as "Other Network" and is linked to SSPs 13 and 15 by links L9 and L10, respectively, as shown in broken lines in FIG. 1. SSPs 13 and 15 are gateways to the Other Network. So far as the INMDR network is concerned, for calls to node 26, the destination is SSP node 13, the gateway to the network containing node 26. When a call from origin SSP 11 arrives at SSP 13 via the direct link L3, and no facilities are available within the Other network to complete the call to node 26, i.e link L9 is blocked, SSP 13 sends a Release_with_Cause message back to the switching unit at origin node SSP 11. Assuming "route advance" is activated at the switch of SSP 11, it will send a Network_Busy TCAP query to the SCP/NP 22. A parameter in the Network_Busy TCAP message could be provided so as to inform the SCP/NP 22 that the congestion occurred outside the INMDR network. Such a "FAILURE CAUSE" parameter already has been proposed in the International Telecommunications Union (ITU) standard Q. 1214 ITU-T Distributed Functional Planes for INCS-1.

The SCP/NP 22 determines a new gateway destination node for the call which avoids using SSP 13, i.e. not via link L1, SSP 12 and link L4, but rather routes the call via link L2 to SSP 15 which also is a gateway to the Other Network and so can complete the call to node 26 via link L10.

As mentioned above, in contrast to known dynamic routing networks, such as DCR, where the network processor computes the alternate routes using information from the switches about the status of their trunk groups, the SCP/NP 22 of the INMDR network does not receive such periodic information. Instead, it computes the alternate routes based solely upon overflow information as represented by the Network_Busy TCAP messages it receives from the switches of the SSPs.

Figure 7:
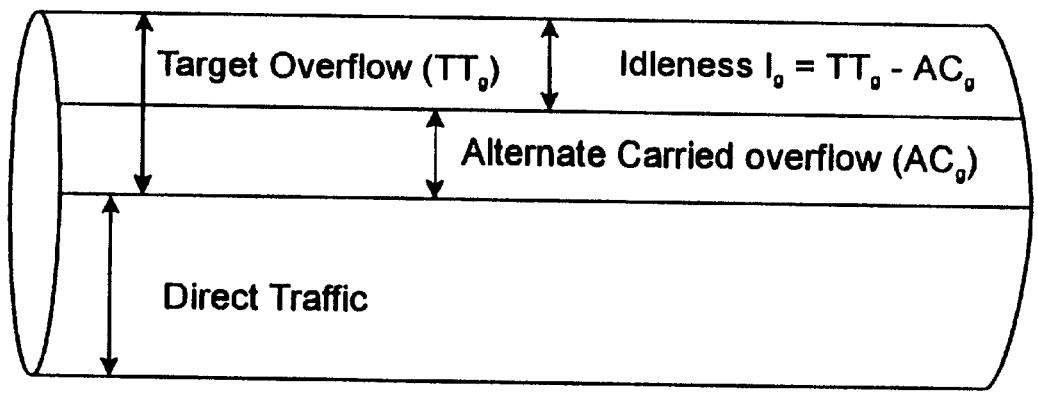
FIGS. 7, 8 and 9 illustrate operation of the SCP/NP in determining preferred alternate routes.

As illustrated in FIG. 7, the trunk group in each link can carry direct and overflow traffic. In INMDR networks, each link is assigned a target overflow $TT_g$. In normal operation, the link will carry a certain amount of Alternate Routing overflow traffic $AC_g$, leaving idle capacity $I_g$. Thus, in normal operation, the link idleness $I_g = TT_g - AC_g$. If the link has overflowed within the last 10 seconds, $I_g = 0$.

In DCR, the trunk group idleness is known by the network processor because it is reported by the switches. The SCP/NP 22 does not have this information and so must infer idleness $I_g$ from the TCAP queries. The sequence is as follows:

1. Initially, the Target overflow $TT_g$ is set to a predetermined value, for example 10, to allow the system to initiate its operation.

2. The SCP/NP 22 continuously monitors the Network_Busy messages to determine the number of overflows for each link and, during each successive time interval TTCycle of, say, 3 minutes, the SCP/NP 22 counts the Network_Busy messages for each link to obtain a measured rate $O_g(\Delta)/\Delta$ of such messages. Preferably, $\Delta$ is equal to mean call holding time h, in which case the measured rate $O_g(h)/h$, which will be used subsequently in this description of the algorithm.

3. The SCP/NP 22 compares the number of Network_Busy messages per interval with a predetermined threshold rate b.

4. If measured rate $O_g(h)/h >> b$, the SCP/NP 22 reduces $TT_g$ by 2, reducing the number of calls alternate-routed sent via the instant link.

If measured rate $O_g(h)/h > b$, $TT_g$ is reduced by 1.
   If measured rate $O_g(h)/h = b$, $TT_g$ is not changed.
   If measured rate $O_g(h)/h < b$, $TT_g$ is increased by 1, increasing the number of calls alternate-routed sent via the instant link.
   If measured rate $O_g(h)/h << b$, i.e. virtually no overflows, $TT_g$ is increased by 2.

This sequence is repeated after every interval TTCycle.

Figure 8:
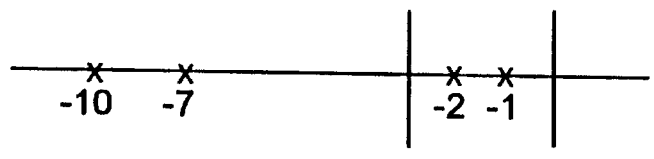

The SCP/NP 22 monitors continuously the number of overflows on each link and retains these data for a predetermined time period t. Referring to FIG. 8, assuming that at time $T_0$ a Network_Busy TCAP message is received, with $TT_g=10$ and, if the mean holding time, for example, is three minutes, the SCP/NP assumes that the calls at T-7 minutes and T-10 minutes have terminated, but the calls at T-1 minutes and T-2 minutes persist. If $TT_g=10$, idleness $I_g=10-2=8$. The SCP/NP 22 calculates $I_g$ in this way for each link.

Figure 9:
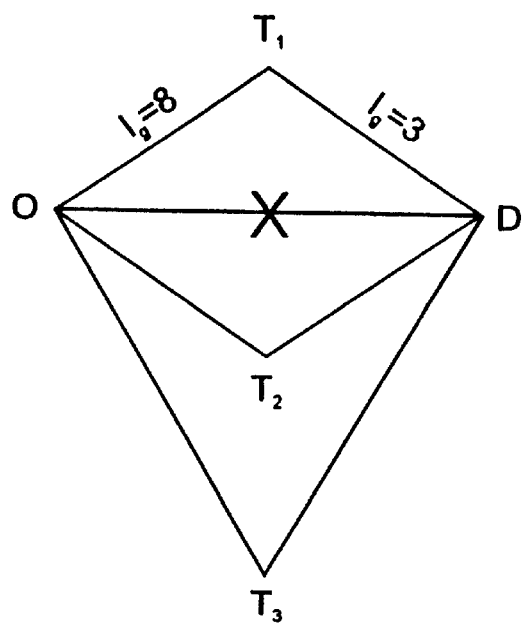

5. As shown in FIG. 9, for each possible two link alternate route, the SCP/NP 22 calculates Residual Capacity RC as $$RC_{od} = \min_{T}[I_{ot}, I_{td}]$$

where $I_{ot}$ and $I_{td}$ are the idleness of links OT and TD, respectively.

In the first alternate route illustrated in FIG. 9, RC=min [8,3]. Eight trunks are free in the first link $OT_1$, but only three links are free in the second link $T_1D$. Consequently, five free trunks cannot be used for tandeming a call between O and D and RC=3.

6. The SCP/NP 22 chooses the alternate route with the greatest Residual Capacity as the preferred alternate route.

It should be noted that throughout this computation, the idleness $I_g$ for the blocked link(s) which prompted the Network_Busy query is(are) set to zero.

The preferred algorithm used by the SCP/NP 22 will now be described in more detail.

2.0 INMDR

The algorithm assumes knowledge of the topology of the network knowledge of the size of all trunk groups in the network and that all trunk groups in the network are bidirectional.

2.1 Variables
For trunk group g=ij between switches i and j

| | |
|---|---|
| $O_g(\Delta)$: | number of calls that overflowed g over the last $\Delta$ seconds (either side) |
| $AC_g(\Delta)$: | number of calls alternate-routed on trunk group g over the last $\Delta$ seconds |
| $TT_g$: | target level for the number of alternate-routed calls on trunk group g |
| $I_g$: | Idleness on trunk group g as of the last update |
| $SI_g$: | safe idleness on trunk group g as of the last update |
| $BUSY_g$: | interval of time over which trunk group g is expected to be busy (Initial modelling has been carried out with $BUSY_g$ set to 30 seconds for all trunk groups g. A possible refinement would define group-specific values based on the trunk group size and an estimation of the traffic offered to it.) |
| $N_g$: | number of circuits on trunk group g |
| $b_{gk}$: | bounds on overflow rate for direct calls between i and j $k = 1,2,3,4$ ($b_g^1 < b_g^2 < b_g^3 < b_g^4$) |
| Also | |
| h: | mean circuit/call holding time |
| TTCycle: | update cycle of $TT_g$ values (TTCycle $\geq$ h) |

2.2 Initialization of global variables
For each trunk group g in the network $O_g(\cdot)=0$
$AC_g(\cdot)=0$
$TT_g=10$ (This initial value of $TT_g$ could be a percentage of the trunk group size instead)

$b_g^1=0.01*\lambda$ where $ErlB(\lambda*h, N_g)=0.01$
$b_g^2=0.03*\lambda$ where $ErlB(\lambda*h, N_g)=0.03$
$b_g^3=0.05*\lambda$ where $ErlB(\lambda*h, N_g)=0.05$
$b_g^4=0.07*\lambda$ where $ErlB(\lambda*h, N_g)=0.07$ (The values 0.01,0.03,0.05,0.07 are parameters of the algorithm. These parameters can be set to a different set of values)

2.3 Target overflow update

The following computation is performed for each switch s in the network. The computation is distributed in time. For example if there are 10 switches, the loops will be launched at times 0 (first switch), 0.1*TTCycle (second switch) 0.2*TTCycle (third switch), . . . , 0.9*TTCycle (tenth switch)

In the following loop, for bidirectional trunk groups, a group g will be considered twice over the window of TTCycle seconds, once for each switch on which g terminates.

```
LOOP
    WAIT DURATION TTCycle
    FOR each trunk group g connected to switch s
        IF       Og(h)/h<bg1    TTg=min {TTg+2,Ng}
        ELSE IF  Og(h)/h<bg2    TTg=min {TTg+1,Ng}
        ELSE IF  Og(h)/h<bg3    TTg=TTg
        ELSE IF  Og(h)/h<bg4    TTg=max {O,TTg-1}
        ELSE                    TTg=max {O,TTg-2}
        END IF
    END FOR
    END WAIT
END LOOP
```

2.4 Route computation

The following procedure is executed by the SCP/NP 22 each time it receives an overflow (Network_Busy) message from one of the network switches, i.e. whenever a call overflows the direct route either because the direct route is full (H0 calls) or because the direct route does not exist (H1 calls).

From the Network_Busy message received at the NP, the identity of the switch o that issued the message, and the identity of the destination d of the call are known.

The route computation may be divided into three phases which are initialization of local variables for route computation, identification of the two best tandem switches.

definition of the recommendation. These phases are described below.

Initialize local variables used for route computation

```
IF od air is H0
    Update Ood(*)
    MaxResCap1=0
    MaXResCaP2=0
ELSE {od pair is H1}
    MaxResCap1=-∞
    MaXResCaP2=-∞
END IF
Tandem1=NULL
Tandem2=NULL
```

Determine the two best tandem switches

```
FOR each possible tandem t between o and d
    Iot = TTot - ACot(h)
    Itd = TTtd - ACtd(h)
    IF od pair is H0
        IF Oot(BUSYot)>0        SIot = 0
        ELSE                    SIot = MAX {0,Iot}
        END IF
        IF Otd(BUSYtd) > 0      SItd = 0
        ELSE                    SItd = max (0,Itd}
        END IF
        ResidualCapacity = min {SIot,SItd}
    ELSE {od pair is H1}
        IF Oot(f * BUSYot) > 0 Iot = -∞
        IF Otd(f * BUSYtd) > 0 Itd = -∞
```

(The parameter $0 \leq f \leq 1$ is used to reduce the likeliness of a tandem where one of the legs of the alternate route through this tandem has overflowed in the recent Residual capacity=min $\{I_{ot}, I_{td}\}$

```
END IF
IF Residual capacity >MaxResCap1
    MaXResCap2=MaXResCap1
    Tandem2=Tandem1
    MaxResCap1=Residual capacity
    Tandem2=t
ELSE IF Residual capacity >MaxResCap2
    MaxResCap2=Residual capacity
    Tandem2=t
END IF
END FOR
```

Determine the recommendation to be returned

```
IF Tandem1=NULL
    Recommendation is BLOCK
ELSE
    Update ACot(*) where t is Tandem1
    Update ACtd(*) where t is Tandem1 †
    IF Tandem2=NULL
        Recommendation is {Tandem1}
    ELSE
        Recommendation is list {Tandem1,Tandem2}
    END IF
END IF †(When Tandem2 ≠ NULL the algorithm may be
```
refined to update also ACot(*) and ACtd(*) for t equal to Tandem2)

2.5 INMDR algorithm (at the NP)
  Perform initialization (section 2.2)
  Launch target overflow update procedure (section 2.3)
  LOOP
    WAIT FOR Overflow message (Network_Busy from one of the SSPs)
      Compute route recommendation (section 2.4)
      Return Recommendation
    END WAIT
  END LOOP

INDUSTRIAL APPLICABILITY

Embodiments of the invention, with the ability to use multiple tandems and/or the above-described procedure for using overflow messages to infer idleness, are expected to lead to improved call completion rates in so-called "intelligent networks".

We claim:

1. A method of routing calls dynamically in a telecommunications network comprising a plurality of switching units and a central computer unit having access to a routing database, the switching units being interconnected by links comprising trunk groups and connected to the central computer unit by a data communication system, each switching unit having call processing software including triggers for initiating queries to the central computer unit during call processing, the method comprising the steps of:

at a first switching unit:
  responding to a destination address in a call to attempt to route a call to a destination switching unit via a direct link and,
  in the event that the attempt is unsuccessful or there is no direct link, issuing to the central computer unit a query message containing the destination address;
at the central computer unit:
  where the direct link exists but the attempt to use it was unsuccessful, responding to the query message by (i) identifying from the query message the link attempted unsuccessfully, (ii) updating the routing database to identify the link as unavailable for a predetermined period of time; whether the query resulted from a lack of a direct link or an unsuccessful attempt to route via an existing direct link, (iii) determining at least one alternative route for the instant call using a tandem switching unit, (iv) compiling a return message including a network address for the tandem switching unit and (v) transmitting the return message to the first switching unit;
at the first switching unit:
  routing the call via a direct link from the first switching unit to the tandem switching unit; and
at the tandem switching unit:
  attempting to complete the call by routing the call via a direct link from the tandem switching unit to the destination switching unit;
in the event that the tandem switching unit cannot complete the call via the third-direct link from the tandem switching unit to the destination switching unit,
at the tandem switching unit:
  sending to the central computer unit a second query message including said destination address,
at the central computer,
  responding to the second query message by (vi) identifying from the query message the direct link that the tandem switching unit attempted unsuccessfully, (vii) updating the routing database to identify such direct link as unavailable, while maintaining as unavailable the direct link first attempted by the first switching unit; (viii) determining at least one second alternative route for the instant call using a second tandem switching unit, (ix) compiling a return message including a network address for the tandem switching unit and (x) transmitting the return message to the first tandem switching unit;
at the first tandem switching unit:
  routing the call via a direct link from the first tandem switching unit to the second tandem switching unit; and
at the second tandem switching unit,
  attempting to route the call via a direct link from the second tandem switching unit to the destination switching unit.

2. A method of routing calls dynamically in a telecommunications network comprising a plurality of switching units and a central computer unit having access to a routing database, the switching units being interconnected by links comprising trunk groups and connected to the central computer unit by a data communication system, each switching unit having call processing software including triggers for initiating queries to the central computer unit during call processing, the method comprising the steps of:

at a first switching unit:
  responding to a destination address in a call to attempt to route a call to a destination switching unit via a direct link and,
  in the event that the attempt is unsuccessful or there is no direct link, issuing to the central computer unit a query message containing the destination address;
at the central computer unit:
  where there is a direct link but the attempt to use it was unsuccessful, responding to the query message by (i) identifying from the query message the link attempted unsuccessfully, (ii) updating the routing database to identify the link as unavailable;
  whether the query resulted from a lack of a direct link or an unsuccessful attempt to route via a direct link, (iii) determining at least one alternative route for the instant call using a tandem switching unit, (iv) compiling a return message including a network address for the tandem switching unit and (v) transmitting the return message to the first switching unit;
at the first switching unit:
  routing the call via a direct link from the first switching unit to the tandem switching unit; and at the tandem switching unit:
  attempting to complete the call by routing the call via a direct link from the tandem switching unit to the destination switching unit;
further at the central computer:
  monitoring continuously the number of queries generated by overflowing calls for each link and retaining these data;
  at intervals (TTCycle), each of which is at least equal to a mean call holding time h, determining for each link a measured rate $O_g(\Delta)/\Delta$ of such messages during a preceding time interval $\Delta$;
  comparing each said measured rate $O_g(\Delta)/\Delta$ with a predetermined threshold overflow call rate b; and
  adjusting a previously-set Target Overflow value $TT_g$ for each link in dependence upon the degree to which the measured rate exceeds or is less than said threshold overflow call rate b;

and, upon receipt of a said query from said first switching unit, where the query resulted from an unsuccessful attempt to route a call via an existing direct link, determining the alternate route by the method steps of:

at the central computer unit:

identifying the direct link that was an attempted unsuccessfully and setting to zero an idleness factor $I_g$ for such direct link, whether the query resulted from a lack of a direct link or an unsuccessful attempt to route via a direct link;

calculating for each link of every potential alternate route for said call an idleness factor $I_g$ by subtracting from the current Target Overflow value $TT_g$ for the particular link the number of calls $AC_g$ alternate-routed via such link during the immediately-preceding mean call holding time interval h;

calculating Residual Capacity RC for each possible alternate route as the minimum idleness of links that could be used in one of said possible alternate routes;

selecting the alternate route with the greatest Residual Capacity as the preferred alternate route;

determining an address for a tandem node in the preferred alternate route and sending a message incorporating said address to said first switching unit.

3. A method as claimed in claim 2, wherein the Residual Capacity RC is calculated for each possible two-link alternate route as $$RC_{od} = \min_T [I_{ot}, I_{td}]$$

where $I_{ot}$ and $I_{td}$ are the idleness of link OT and link TD, respectively.

4. A method as claimed in claim 2, wherein, prior to the accumulation of any overflow messages, the Target Overflow value $TT_g$ for each link is set initially to a predetermined value.

5. A method as claimed in claim 2, wherein, in the event that the tandem node switching unit cannot complete the call via a direct link to the destination node, the tandem node switching unit issues a query message to the central computer for a further alternate route, the method further comprises the step of, at the central computer, setting an idleness factor for the second direct link to zero and, with the idleness factor for the first direct link still set to zero, calculating a second alternate route from the tandem node to the destination node using the same steps used to calculate the first alternate route, issuing to the first tandem node switching unit a recommendation for a second tandem node in the second alternate route, and, upon receipt of the recommendation, at the first tandem node switching unit attempting to route the call via a direct route to the second tandem node switching unit.

6. A method as claimed in claim 2, wherein, in the event that the Residual Capacity is less than or equal to zero, instead of the step of selecting an alternate route with the greatest Residual capacity, and the step of determining an address for the tandem node and incorporating the address in a message to the first switching unit, the method comprises the step of returning a block recommendation from the central computer to the first switching unit.

7. Telecommunications network apparatus comprising a plurality of switching units and a central computer unit having access to a routing database, the switching units being interconnected by links comprising trunk groups and connected to the central computer unit by a data communication system, each switching unit having call processing software including triggers for initiating queries to the central computer unit during call processing, first switching unit having means for responding to a destination address in a call to attempt to route a call to a destination switching unit via a direct link and, in the event that the attempt is unsuccessful or no direct link exists, issuing to the central computer unit a query message containing the destination address;

the central computer unit having means for responding to the query message where the direct link exists but the attempt to use it was unsuccessful, by (i) identifying from the query message the link attempted unsuccessfully, (ii) updating the routing database to identify the link as unavailable;

whether the query resulted from a lack of a direct link or an unsuccessful attempt to use a direct link, (iii) determining at least one alternative route for the instant call using a tandem switching unit, (iv) compiling a return message including a network address for the tandem switching unit and (v) transmitting the return message to the first switching unit;

the first switching unit further comprising means for responding to the return message by routing the call via a direct link from the first switching unit to the tandem switching unit;

the tandem switching unit comprising means for attempting to complete the call by routing the call via a direct link from the tandem switching unit to the destination switching unit; and in the event that the tandem switching unit cannot complete the call via such direct link, sending to the central computer unit a second query message including said destination address, the central computer further comprising means for responding to the second query message by (vi) identifying from the query message the direct link attempted unsuccessfully by the tandem switching link, (vii) updating the routing database to identify the link as unavailable, while maintaining as unavailable the direct link attempted unsuccessfully by the first switching unit; (viii) determining at least one second alternative route for the instant call using a second tandem switching unit, (ix) compiling a return message including a network address for the second tandem switching unit and (x) transmitting the return message to the first tandem switching unit;

the first tandem switching unit further comprising means for responding to the return message to route the call via a direct link from the first tandem switching unit to the second tandem switching unit;

the second tandem switching unit comprising means for attempting to route the call via said direct link from the second tandem switching unit to the destination switching unit.

8. Telecommunications network apparatus comprising a plurality of switching units and a central computer unit having access to a routing database, the switching units being interconnected by links comprising trunk groups and connected to the central computer unit by a data communication system, each switching unit having call processing software including triggers for initiating queries to the central computer unit during call processing, a first switching unit comprising means for responding to a destination address in a call to attempt to route a call to a destination switching unit via a direct link and, in the event that the attempt is unsuccessful or there is no direct link, issuing to the central computer unit a query message containing the destination address;

the central computer unit comprising means for responding to the query message, where there is a direct link but the attempt to use it was unsuccessful, by (i) identifying from the query message the link attempted unsuccessfully, (ii) updating the routing database to identify the link as unavailable; and, whether the query resulted from a lack of a direct link or an unsuccessful attempt to route via a direct link, (iii) determining at least one alternative route for the instant call using a tandem switching unit, (iv) compiling a return message including a network address for the tandem switching unit and (v) transmitting the return message to the first switching unit; the first switching unit further comprising means responsive to the return for routing the call via a direct link from the first switching unit to the tandem switching unit;

the tandem switching unit further comprising means for attempting to complete the call by routing the call via said direct link from the first switching unit to the destination switching unit;

wherein the central computer further comprises means for:

monitoring continuously the number of query messages generated by overflowing calls for each link and retaining these data;

at intervals (TTCycle), each of which is at least equal to a mean holding time h, determining for each link a measured rate $O_g(\Delta)/\Delta$ of such messages during a preceding time interval $\Delta$;

comparing each said measured rate $O_g(\Delta)/\Delta$ with a predetermined threshold overflow call rate b; and adjusting a previously-set Target Overflow value $TT_g$ for each link in dependence upon the degree to which the measured rate exceeds or is less than said threshold overflow call rate b;

the central computer yet further comprising means responsive to receipt of a said query from said first switching unit, where the query resulted from an unsuccessful attempt to route a call via an existing direct link, for determining the alternate route by identifying the direct link that was attempted unsuccessfully and setting to zero an idleness factor $I_g$ for such direct link, whether the query resulted from a lack of a direct link or an unsuccessful attempt to route via an existing direct link, calculating for each link of every potential alternate route for said call an idleness factor $I_g$ by subtracting from the current Target Overflow value $TT_g$ for the particular link the number of calls $AC_g$ alternate-routed via such link during the immediately-preceding call holding time interval h;

calculating Residual Capacity RC for each possible alternate route as the minimum idleness of links that could be used in one of said possible alternate routes;

selecting the alternate route with the greatest Residual Capacity as the preferred alternate route;

determining an address for a tandem node in the preferred alternate route and sending a message incorporating said address to said first switching unit.

9. Apparatus as claimed in claim 8, wherein the means responsive to the query for calculating Residual Capacity RC calculates such Residual Capacity RC for each possible two-link alternate route as $$RC_{od} = \min_T [I_{ot}, I_{td}]$$

where $I_{ot}$ and $I_{td}$ are the idleness of link OT and link TD, respectively.

10. Apparatus as claimed in claim 8, wherein the central computer further comprises means operable, prior to the accumulation of any overflow messages, to set the Target Overflow value $TT_g$ for each link initially to a predetermined value.

11. Apparatus as claimed in claim 8, wherein the tandem node switching unit further comprises means operable, in the event that the tandem node switching unit cannot complete the call via a direct link to the destination node, to issue a query message to the central computer for a further alternate route, the central computer being operable to set an idleness factor for the second direct link to zero and, with the idleness factor for the first direct link still set to zero, calculate a second alternate route from the tandem node to the destination node using the same steps used to calculate the first alternate route, and issue to the first tandem node switching unit a recommendation for a second tandem node in the second alternate route, the first tandem node switching unit having means operable, upon receipt of the recommendation, for attempting to route the call via a direct route to the second tandem node switching unit.

12. Apparatus as claimed in claim 8, wherein the central computer unit comprises means operable, in the event that the Residual Capacity is less than or equal to zero, to return a block recommendation from the central computer to the first switching unit instead of said message incorporating said address for the tandem node.

* * * * *